Figure 1:
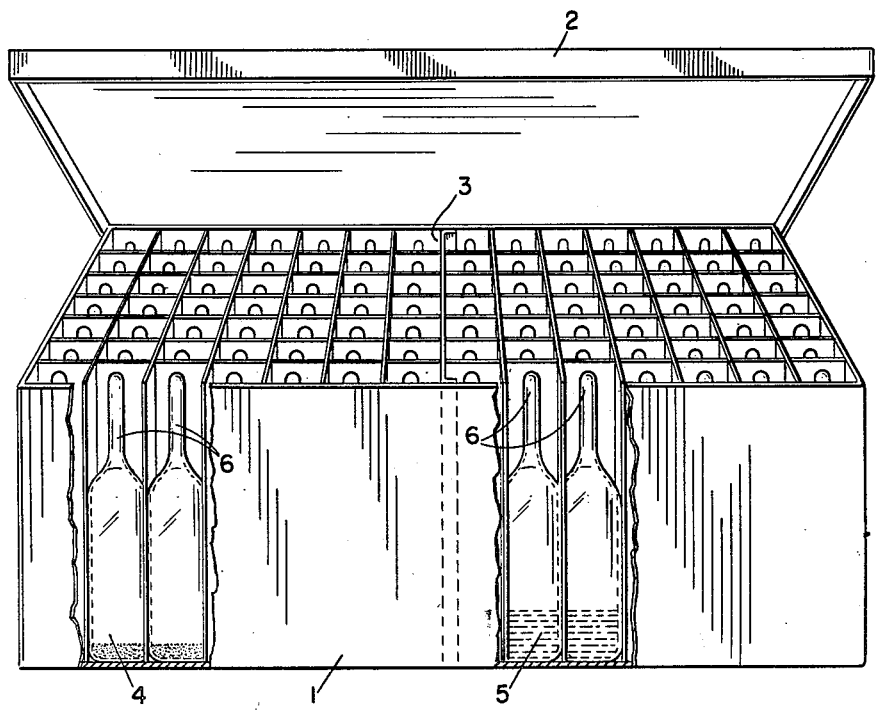

May 27, 1952 L. LIBENSON 2,598,004
STABILIZED TETRATHIODILACTIC AND TETRATHIODIGLYCOLLIC
ACID PHARMACEUTICAL
Filed Aug. 31, 1949 2 SHEETS—SHEET 1

INVENTOR
LEON LIBENSON
BY
Pennie, Edmonds, Morton & Barrows
ATTORNEYS

May 27, 1952  L. LIBENSON  2,598,004
STABILIZED TETRATHIODILACTIC AND TETRATHIODIGLYCOLLIC
ACID PHARMACEUTICAL
Filed Aug. 31, 1949  2 SHEETS—SHEET 2

INVENTOR
LEON LIBENSON
BY
Pennie, Edmonds, Morton & Barrows
ATTORNEYS

Patented May 27, 1952

2,598,004

UNITED STATES PATENT OFFICE 2,598,004

STABILIZED TETRATHIODILACTIC AND TETRATHIODIGLYCOLLIC ACID PHARMACEUTICAL

Leon Libenson, Flemington, N. J.

Application August 31, 1949, Serial No. 113,410

8 Claims. (Cl. 167—65)

This invention relates to a pharmaceutical composition which is suitable for use in the treatment of rheumatoid arthritis, to a method for the preparation thereof, and to an article of manufacture suitable for use in the preparation of such compositions.

Various methods have been advanced as being useful in the treatment of rheumatoid arthritis. Thus, gold salts have been used, but their use is limited by their toxic efforts which at times are so great as to require suspension of the treatment. In an article entitled "Toxicity and Mode of Action of the Gold Salts," reported in "Experimental Medicine and Surgery," vol. III, No. 2, pages 146–153 (May, 1945) it has been reported that the therapeutic effect of the gold salts is exerted through their action on glutathione and other thio compounds in the tissues. This action consists in blockading the sulfhydryl groups of the thio compounds with subsequent production of hydrogen sulfide at the tissues level. The chemical reactions taking place in this process can be expressed by the following equations:

$$GSH + AuX = GSAu + HX$$
$$GSAu + H_2O = GOH + AuSH$$
$$AuSH + GSH = GSAu + H_2S$$

where G represents the non-sulfhydryl residue of glutathione and X represents the non-gold residue of the gold compound. By this action, while exerting their therapeutic activity in rheumatoid arthritis, the gold salts blockade and destroy glutathione and other vital sulfhydryl compounds in the cells and consequently prevent or disrupt the processes of oxy-reduction in the tissues. The toxic reactions encountered in the treatment of arthritis with gold salts are the result of this destruction of sulfhydryl compounds.

Colloidal sulfur has also been employed for the treatment of rheumatoid arthritis. However, its use frequently produces anaphylactoid shock.

In accordance with the present invention it has been found that sodium tetrathiodiglycollate has an action similar to that of the gold salts in producing hydrogen sulfide at the tissues level. This can be expressed by the following equations:

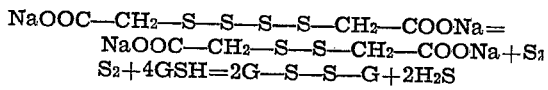
$$S_2 + 4GSH = 2G\text{---}S\text{---}S\text{---}G + 2H_2S$$

where G is the non-sulfhydryl residue of glutathione. In this case, however, glutathione is not destroyed by the elemental sulfur released by sodium tetrathiodiglycollate. Rather, by the action of sulfur glutathione is transformed to its disulfide from G—S—S—G which is reversibly transformed in the system by a reduction process back into its reduced form:

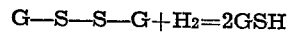

This mode of action of sodium tetrathiodiglycollate explains its low toxicity, the minimum lethal dose of this compound when determined on mice being 100 mg./kg. A suitable therapeutic dose, administered every other day, is 23.5 mg. (equivalent to 20.0 mg. of tetrathiodiglycollic acid). This dose corresponds to 10.4 mg. of total sulfur and to 5.2 mg. of elemental sulfur released by the compound. Usually, a series of 50 or 60 injections completes a treatment. Nevertheless, due to its lack of toxicity, treatments can be prolonged if necessary without any untoward effects.

Unlike colloidal sulfur, the particles of which are variable in size depending upon its age and method of preparation, the elemental sulfur released by sodium tetrathiodiglycollate is molecular sulfur ($S_2$) which is absorbed as such by the tissues without producing anaphylactoid shock characteristic of colloidal sulfur. Furthermore, sodium tetrathiodiglycollate affords a means for the administration of sulfur in a highly active and constant form, thus permitting the dosage of sulfur administered to be easily and accurately controlled.

Unlike thiosulfates and tetrathionates, which are relatively stable in a neutral or alkaline aqueous solution, sodium tetrathiodiglycollate releases elemental sulfur at a pH of 7.3, which is the pH of human blood. When an organic tetrathio acid, such as tetrathiodiglycollic acid, is treated with aqueous solutions of alkali metal hydroxides, the salts formed decompose immediately with the formation of sulfur and the salts of the corresponding dithio acids. On the other hand, as is disclosed by German Patent No. 336,021, when an anhydrous solution of tetrathiodiglycollic acid is treated with an alcoholic solution of an alkali metal hydroxide, salts of the acid can be obtained as a white crystalline mass. However, when an attempt is made to dissolve in water the salts thus formed, they decompose immediately with the formation of sulfur and the salts of dithiodiglycollic acid. It is therefore impossible, by the procedures outlined, to prepare aqueous solutions of salts of organic tetrathio acids which solutions are sufficiently stable to be injected parenterally before their decomposition takes place.

It is therefore an object of the present invention to provide an aqueous solution containing a salt of a tetrathio acid, such as tetrathiodiglycollic acid or tetrathiodilactic acid, or a mixture of the salts of such acids, which solution is of the proper pH and also of sufficient stability to permit its parenteral administration before decomposition takes place. This object can be accomplished by mixing the tetrathio acid and an aqueous solution of di-basic ammonium or di-alkali metal phosphate (e. g., Na₂HPO₄), the amounts of the tetrathio acid and phosphate being such that the resultant mixture has a pH approximating that of human blood.

The following examples illustrate in detail the preparation of various compositions falling within the scope of the present invention, and are to be considered not limitative thereof.

*Example I*

20 mg. of pure tetrathiodiglycollic acid are admixed with 3 ml. of a 1.75% by weight aqueous solution of dibasic sodium phosphate (Na₂HPO₄). The acid dissolves readily, giving a clear solution the pH of which is 7.0. On standing at room temperature, an interval of one hour elapses before sulfur begins to separate from the solution.

*Example II*

20 mg. of pure tetrathiodiglycollic acid are admixed with 5 ml. of a 1.05% aqueous solution of dibasic sodium phosphate. The acid dissolves readily, giving a clear solution the pH of which is 7.0. On standing at room temperature, an interval of 50 minutes elapses before sulfur begins to separate from the solution.

*Example III*

20 mg. of pure tetrathiodiglycollic acid are admixed with 3 ml. of a 2.5% by weight aqueous solution of dibasic ammonium phosphate

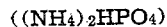

The acid dissolves readily, giving a clear solution the pH of which is 7.0. On standing at room temperature, an interval of 25 minutes elapses before sulfur begins to separate from the solution.

*Example IV*

20 mg. of pure tetrathiodiglycollic acid are admixed with 3 ml. of a 1.95% by weight aqueous solution of dibasic potassium phosphate

The acid dissolves readily, giving a clear solution the pH of which is 7.0. On standing at room temperature, an interval of 40 minutes elapses before sulfur begins to separate from the solution.

Alternatively, a composition falling within the scope of this invention can be prepared by mixing the pure dry tetrathio acid and anhydrous dibasic sodium phosphate to form a dry mixture which can thereafter be admixed with water, as Example V which follows shows:

*Example V*

20 mg. of pure dry tetrathiodiglycollic acid are admixed with 53 mg. of anhydrous dibasic sodium phosphate powder. This mixture dissolves readily in 3 cc. of distilled water, giving a clear solution, the pH of which is 7.0. On standing at room temperature, an interval of one hour elapses before sulfur begins to separate from the solution.

Each of the above examples illustrates the preparation of a single dose which may be used for parenteral administration a few minutes after preparation.

Various modifications may be made in the specific procedures described in the specific examples. Thus, the relative proportions of the ingredients may be varied somewhat, so long as the pH of the final mixture is about 7.0, for example, within the range from 6.5 to 7.2.

Also, an equal number of moles of tetrathiodilactic acid may be substituted for the tetrathiodiglycollic acid used in the examples. Tetrathiodilactic acid can be prepared by a method similar to that used for the preparation of tetrathiodiglycollic acid. Thus, two moles of tetrathiolactic acid are treated in anhydrous ether solution with one mole of sulfur monochloride according to the reaction:

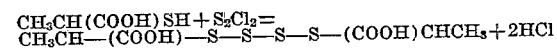

The ether is distilled off, and the residue is treated with carbon disulfide. By successive crystallizations, pure tetrathiodilactic acid is obtained.

For the convenience of the customer, a box can be provided containing at least one (generally 10-60) ampule or vial containing 15-25 mg. of tetrathiodiglycollic acid or a chemically equivalent amount of tetrathiodilactic acid and also containing a like number of ampules or vials each containing a sterile aqueous solution of the dibasic ammonium or alkali metal phosphate, the amount of phosphate in each vial being such that when the liquid contained therein is admixed with the acid contained in one of the other vials an aqueous solution of appropriate pH value results.

This feature of the invention is illustrated in Fig. 1 of the drawings, wherein the numeral 1 designates a container having a lid 2 and a partition 3. The ampules 4 and 5 are of conventional design permitting easy removal of the contents by breaking the necks 6, the former ampules containing the appropriate amounts of the tetrathio acid and the latter ampules containing the appropriate amount of aqueous phosphate solution.

Figure 2:
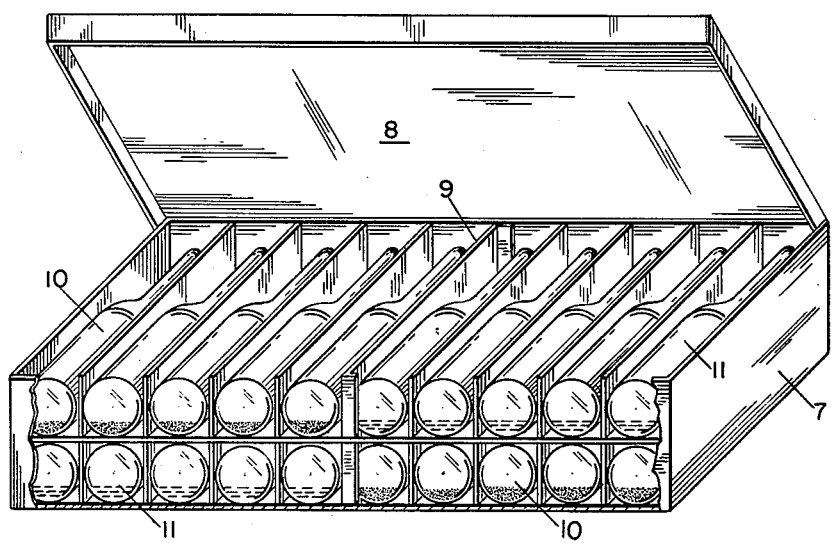

This feature of the invention is also illustrated in Fig. 2 of the drawings, wherein the numeral 7 designates a box with the front side removed, the box having a lid 8 and partitions 9. The ampules 10 each contain an appropriate amount of the tetrathio acid and the ampules 11 each contain an appropriate amount of the aqueous phosphate solution.

Figure 3:
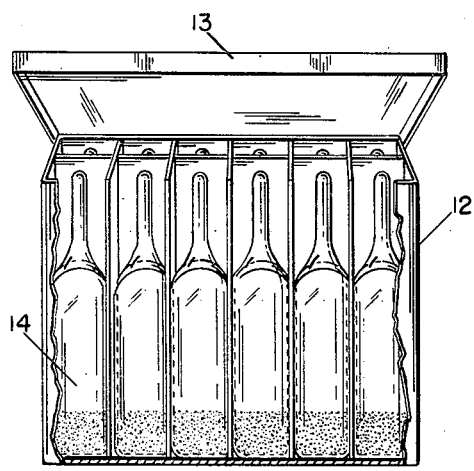

Also, for the convenience of the customer, a box can be provided containing one or more (generally 10-60) ampules each containing a dry mixture of 15-25 mg. of tetrathiodiglycollic acid or an equivalent amount of tetrathiodilactic acid or an equivalent amount of a mixture of such acids and also containing an appropriate amount of the phosphate or mixture of phosphates such that when the mixture contained in an ampule is dissolved in water a solution of the appropriate pH value results. This feature is shown in Fig. 3 in which the numeral 12 designates a box having a lid 13, the box containing the ampules 14 each of which contain an appropriate amount of the dry mixture.

I claim:

1. A composition of matter suitable for use as a pharmaceutical comprising an aqueous solution of at least one phosphate selected from the group consisting of diammonium phosphate and di-alkali metal phosphates and at least one tetrathio acid selected from the group consisting of tetrathiodiglycollic acid and tetrathiodilactic acid, the pH value of said solution being about seven.

2. Composition as in claim 1 in which the phosphate is disodium phosphate and in which the tetrathio acid is tetrathiodiglycollic acid.

3. An anhydrous mixture which consists essentially of at least one tetrathio acid selected from the group consisting of tetrathiodiglycollic acid and tetrathiodilactic acid and at least one phosphate selected from the group consisting of diammonium phosphate and di-alkali metal phosphates, the proportions of phosphate and tetrathio acid being such that when the mixture is dissolved in water a solution having a pH value of about seven results.

4. A mixture as in claim 3 in which the phosphate is disodium phosphate and in which the tetrathio acid is tetrathiodiglycollic acid.

5. As an article of manufacture, an ampule containing an anhydrous mixture which consists essentially of at least one phosphate selected from the group consisting of diammonium phosphate and di-alkali metal phosphates and at least one tetrathio acid selected from the group consisting of tetrathiodiglycollic acid and tetrathiodilactic acid in amount equivalent to 15-25 mg. of tetrathiodiglycollic acid, the amount of phosphate being such that when said mixture is dissolved in a few ml. of water a solution having a pH value of about seven results.

6. An ampule as in claim 5 in which the phosphate is disodium phosphate and in which the tetrathio acid is tetrathiodiglycollic acid.

7. A pharmaceutical which consists essentially of at least one anhydrous tetrathio acid selected from the group consisting of tetrathiodiglycollic acid and tetrathiodilactic acid and at least one phosphate selected from the group consisting of diammonium phosphate and di-alkali metal phosphates, the proportion of phosphate and tetrathio acid being such as to form a solution having a pH value of about seven.

8. A pharmaceutical as in claim 7 in which the tetrathio acid is tetrathiodiglycollic acid and in which the phosphate is disodium phosphate.

LEON LIBENSON.

REFERENCES CITED

The following references are of record in the file of this patent:

UNITED STATES PATENTS

| Number | Name | Date |
|---|---|---|
| 2,135,642 | Klopfer | Nov. 8, 1938 |
| 2,250,553 | Ruskin | July 29, 1941 |

OTHER REFERENCES

Wyss: The Merck Report, April 1945, pages 16 to 18.

Sollmann: A Manual of Pharmacology, 7th edition, 1948, W. B. Saunders Company, page 126.